Jan. 18, 1955  F. MEYERS  2,699,883
POCKET ATOMIZER
Filed Jan. 10, 1950
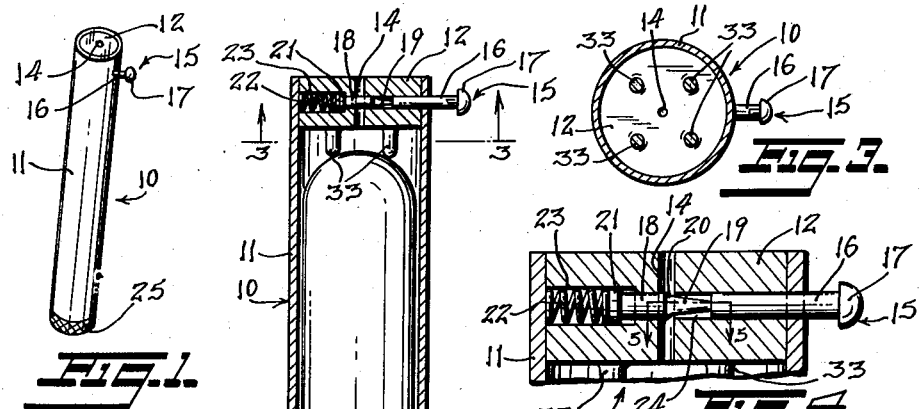
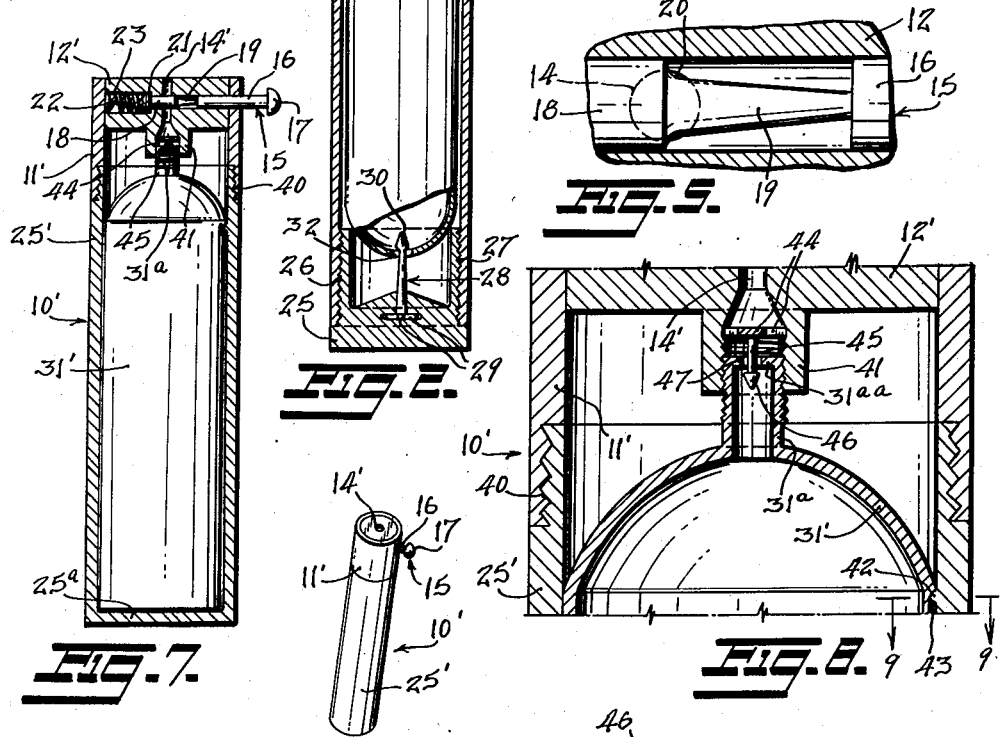
INVENTOR.
FRANK MEYERS
BY
ATTORNEY 2,699,883
Patented Jan. 18, 1955

2,699,883
POCKET ATOMIZER
Frank Meyers, Bronx, N. Y.

Application January 10, 1950, Serial No. 137,803

2 Claims. (Cl. 222—5)

This invention relates to new and useful improvements in devices for the storage therein of a liquid or gaseous fluid under pressure and for the discharge therefrom when desired of a predetermined portion of such fluid in the form of a jet or atomized spray; and, more particularly, the aim is to provide a novel and valuable such device, and one which may be made so small and compact as to be properly described as a pocket atomizer, and one, further, which has all the advantages, among others, next to be referred to.

A feature of the invention is the provision of a small, elongate and preferably generally cylindrical housing or outer main container, for repeated use, and in each case in connection with a replaceable discardable cartridge to be inserted in said main container; said cartridge being hermetically sealed and containing therein the fluid under pressure.

Another feature, in combination with that just summarized, are provisions such that the cartridge remains hermetically sealed until, following its placement in said main container, the latter itself is hermetically sealed incidental to replacing an end-cap or analogous closure temporarily removed to permit insertion of the cartridge; with the arrangement further such that, incidental to hermetical sealing of the main container by replacement of the latter's said closure, the seal of the cartridge is automatically thereby broken, thus immediately to place the interior of the cartridge in open communication with the interior of the main container and so to allow transfer of the fluid from the cartridge to the container for storage under pressure therein as well as in the cartridge.

A further feature of the invention is the inclusion in said main container of a manually nicely controllable valve means which, normally held fully closed, may when desired be more or less opened, thereby as above to discharge a predetermined portion of the stored fluid in the form of a jet or atomized spray; in which latter connection the arrangement is further such that, with the device of so small bulk as to be able to be carried, for instance, in a vest pocket, or small ladies' purse, not only may the rate of discharge of the fluid in spray form be varied as desired per unit of time during which said valve means is manually held open, but said valve means is, preferably, at the end of the main container opposite to the end thereof whereat said closure is placed.

The substance thus to be supplied originally from the renewable cartridge and actually at said discharge means of the main container may, for example, be a perfume, a disinfectant, an air purifier, a deodorant, a medicament, etc., etc. Said substance as sealed in the cartridge will be thus confined in company with a suitable quantity of such an expellant as Freon or an equivalent; with the total contents of the sealed cartridge so confined therein that all said contents are under a high inherent pressure.

A very important feature of the invention is that the cartridge need not itself include a release valve, and so can be cheaply made and economically discarded when emptied. On the other hand, the said main container may be expensively embellished or otherwise made of de luxe type, and re-used as often as desired.

Regardless of the relative cost of the metal or other material used for the main container or its elaborateness of exterior decoration, the fact that said container may be repeatedly used as often as desired, and in repetitive association with one after another of a large number of successively contained sealed cartridges, is of marked advantage in dispensing devices for delivering a spray of a perfume, a medicament or the like. The elimination from the cartridge of a release valve or equivalent is highly important, as considerable expense and difficulties are encountered in endeavoring practicably to provide a leak-proof release valve on the cartridge. This undesirable if not prohibitive item of cartridge cost is obviated in the case of every cartridge.

Still a further feature of the invention is that a refill, that is, the removal of an exhausted cartridge from the main container and the insertion and automatic piercing as above of a substitute cartridge, may be effected readily and substantially instantaneously, by the user of the device; and so without necessity of returning the device to the factory for refill.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view showing one now favored embodiment of the invention; which view may be taken as drawn substantially to actual scale.

Fig. 2 is a central longitudinal section, drawn to a scale approximately about three times that of Fig. 1, and showing the valve means of the main container, fully closed.

Fig. 3 is a horizontal section, taken on the line 3—3 of Fig. 2.

Fig. 4, drawn to a scale about twice that of Fig. 2, is a fragmentary sectional view showing parts as seen in Fig. 2, but with here the valve member of said valve means in one of a multitude of possible adjustments of said member for establishing a selected rate of spray discharge.

Fig. 5, drawn to a scale about four times that of Fig. 4, is a fragmentary horizontal section taken on the line 5—5 of Fig. 4.

Fig. 6 is a perspective view similar to Fig. 1, but illustrating the pocket atomizer constructed in accordance with a modification of the present invention.

Fig. 7 is an enlarged central longitudinal sectional view of Fig. 6.

Fig. 8 is an enlarged detailed view of a portion of Fig. 7.

Fig. 9 is an enlarged partial transverse sectional view taken on the line 9—9 of Fig. 8.

Fig. 10 is an enlarged perspective view of the piercing member used in the form of the invention shown in Figs. 6 to 9.

The pocket atomizer, according to the first form of the present invention shown in Figs. 1 to 5, includes a main container 10, having a cylindrical side wall 11, permanently closed at its top by a plug-like structure 12 suitably permanently anchored to and inside the top portion of said wall 11.

Said structure 12 has a substantially central clear-through port 14 terminating at its top in a discharge orifice of a suitably small diameter to act when said port is opened to the maximum as a means for discharging a fine jet or atomized spray of the substance under pressure inside the main container 10.

The aforesaid manually nicely controllable valve means, the same being provided for varying the effective cross-sectional area of the port 14, is herein shown as comprising a valve member which as a whole is designated 15, and which is part of an endwisely movable rod-structure including a stem 16 extended not only through the plug-like structure 12 but also through the side wall 11. Beyond the latter, the outer end of the stem 16 carries a push-button 17. The valve member 15 includes a cylindrical portion 18, and a tapered portion 19. Said tapered portion 19, as will be noted most clearly from Fig. 5, is conically tapered over the major portion of its length, but, adjacent to the portion 18, is all around the same rather sharply concavely arched or rounded out as indicated at 20.

Said rod-structure including the valve member 15 further includes, at the end of the portion 18 remote from the said rounded out end of the tapered portion 19, a small collar-enlargement 21; beyond which element 21 is an expansile coil spring 22. The plug-structure 12, diametrally thereof, and along a line of extension at right angles to the direction of extension of the port 14, is cavitated, to provide a cylindrical chamber 23 for accommodation of the spring 22, and also to provide another cylindrical chamber 24, axially aligned with the chamber 23 but of less diameter than the latter, for accommodation of the valve member 15 and the stem 16. The diameter of the chamber 24 is the same as the like diameter of the valve member portion 18 and of the stem 16. The diameter of the chamber 23 is the same as that of the collar-enlargement 21.

The bottom open end of the main container 10 is shown as closable by a screw-cap 25; and such cap in the present case is illustrated as having an external thread 26. Consequently, the coacting thread on the container 10 is, as indicated at 27, carried internally of the wall 11.

Upstanding from the cap 25 is a piercing pin 28, the same being shown as suitably anchored in place by being embedded in said cap, as, for example, by making the base portion of said pin, where thus embedded, of cruciform shape as indicated at 29. The pin 28, at its upper or pointed end, is shown as barbed, as at 30.

A cartridge pursuant to the invention and in place in the main container 10 is shown at 31; said cartridge being illustrated as, after being placed in the said container 10 in hermetically sealed condition, having been thereafter pierced by the pin 28 consequent upon applying and turning up tightly the screw-cap 25. The function of the barb 30 is to avoid any chance of any upper end portion of the pin 28 from blocking up the hole pierced in the cartridge bottom by the piercing action of said pin. Thus, always, the hole pierced will be, relative to the portion of the pin finally extending through said hole, large enough, as indicated at 32 in Fig. 2, fully to open up communication between the interior of the cartridge and the interior of the main container.

It is further to be noted from Fig. 2 that the external diameter of the cartridge 31 is somewhat less than the internal diameter of the wall 11, so that the contents of the cartridge may rise up in the main container 10 toward the top thereof. Also, to prevent any possibility that the piercing action of the pin 28 relative to the cartridge will ever force the upper end of the latter tight against the lower end of the port 14, a plurality of depending legs 33 are shown as carried by the plug-structure 12. In the present case, by way of example, four such legs are illustrated at present. Any equivalently acting arrangement could be employed, as, for further example, a single such leg, or a ring-like downward extension from said plug-structure with one or more slots, grooves or ports therethrough.

As already stated, with the parts as shown in Fig. 2 the valve member 15 is in normal position, that is, is acted on by the spring 22 to cause full closing of the port 14 by the cylindrical portion 18 of said valve member. If, however, a slight inward push is imparted to the button 17, said port will be partly opened, for instance, to the very slight extent indicated in Fig. 4, and is more clearly shown in Fig. 5. Accordingly as said button is pushed in more and more, by minute stages of advance, with consequent further and further movement of the basal end 20 of the tapered portion 19 of the valve member toward the left in Fig. 5, the degree of opening of the port 14 will be more and more increased. Yet, immediately on release of finger pressure against the push-button 17, the valve member 15 is instantly snapped back to the condition shown in Figs. 2 and 3, fully to close the port 14.

In the modification of the invention shown in Figs. 6 to 10, the pocket atomizer is characterized by a main body 10′ having a short cylindrical side wall 11′ and a longer tubular cap 25′ having its outer end permanently closed by a thickened wall 25ᵃ. The outer end of the cylindrical side wall 11′ is closed by a plug-like structure 12′ which is permanently secured to the wall 11′, as in the previous form of the invention, and formed with the port 14′.

The cap 25′ is of a size to completely contain the cartridge 31′ which contains the material to be sprayed by the atomizer. The top of the cartridge 31′ is formed with a reduced neck portion 31ᵃ which is externally threaded and closed at its outer end by a thinner and thus weaker wall 31ᵃᵃ.

The adjacent ends of the cylindrical wall 11′ and the cap 25′ are openably secured together by interengageable threads 40. The inside of the plug-like structure 12′ is formed with an internally threaded tubular extension 41 arranged concentric with the port 14′ and which is arranged to thread itself onto the externally threaded neck 31ᵃ of the cartridge 31′ at the same time that the cylindrical wall 11′ and the cap 25′ are being screwed together. To retain the cartridge 31′ against turning within the cap 25′ while the tubular extension 41 is threading itself onto the neck 31ᵃ, the interior of the cap is formed with an inwardly extended nipple 42, see Figs. 8 and 9, which engages a complementary groove 43 formed in the side of the cartridge 31′. The groove 43 is formed longitudinally in the side of the cartridge 31′ so that the nipple 42 will be engaged into the groove while the cartridge 31′ is being slipped into the cap 25′.

Within the tubular extension 41, which is in direct communication with the port 14′, there is means for piercing the weaker end wall 31ᵃᵃ while the extension 41 is being threaded onto the neck 31ᵃ of the cartridge 31′. The piercing means is characterized by a base 44 in form of a web-like structure which is secured in position in the top portion of the tubular extension 41 as by welding or the like. Depending from the base 44 there is a shank 45 formed at its free end with an enlarged piercing head 46. The piercing head 46 has its free end pointed and has a maximum diameter at one point which is greater than that of the shank 45 so as to form an enlarged hole 47, see Fig. 8, in the wall 31ᵃᵃ as the head is forced through that wall. In the completely assembled position of the parts, as shown in Fig. 8, the shank 45 will be within the enlarged hole 47 leaving a clearance for the material to be sprayed to pass out of the cartridge 31′ into the port 14′ where its discharge from the main container 10′ will be controlled by the valve as in the previous form of the invention.

In other respects, the modified form of the invention is similar to the first form and like reference numerals identify like parts in each of the several views.

It is proposed that the devices of the present invention be used primarily for dispensing perfume or the like and that the articles be designed to be carried in one's purse or pocket, but it is appreciated that the devices can be adapted to dispense any fluid—liquid or gas, powder or similar materials that can be dispensed by pressure, that the devices can be made of a larger size for convenient use in the home, office or factory to dispense insecticides, air fresheners, moth proofing compounds, paints, waxes, waterproofing compounds for fabrics and the like materials.

While I have illustrated and described the preferred embodiment of my invention, it is to be understood that I do not limit myself to the precise construction herein disclosed and the right is reserved to all changes and modications coming within the scope of the invention as defined in the appended claims.

Having thus described my invention, what I claim as new, and desire to secure by United States Letters Patent is:

1. A pocket atomizer comprising an elongated tubular container, a hermetically sealed elongated cylindrical cartridge containing fluid fitted in said container, a plug for sealing one end of said container, a piercing element carried by said plug for piercing the adjacent end of the cartridge, a circular plug sealing the other end of the container, said circular plug having an axially disposed discharge outlet and having a counterbore intersecting said outlet and terminating in an enlarged portion at one end, spacing means mounted between said circular plug and cylindrical cartridge, said container having a bore in axial alignment with the other end of said counterbore, a manually operable plunger slidable in said counterbore and extending outwardly of the bore in the container, the inner end of said plunger extending into the enlarged portion of the counterbore, a collar on the extremity of said inner end, and an expansion spring in said enlarged portion between the collar and container for urging the plunger outwardly, said plunger having a frusto-conical portion intermediate its ends movable across the discharge outlet for controlling the discharge of the fluid escaping from the cartridge.

2. A pocket atomizer comprising an elongated tubular container, a hermetically sealed elongated cylindrical cartridge containing fluid fitted in said container, a plug for sealing one end of said container, a piercing element carried by said plug for piercing the adjacent end of the cartridge, a circular plug sealing the other end of the container, said circular plug having an axially disposed discharge outlet and having a counterbore intersecting said outlet and terminating in an enlarged portion at one end, said container having a bore in axial alignment with the other end of said counterbore, a manually operable plunger slidable in said counterbore and extending outwardly of the bore in the container, the inner end of said plunger extending into the enlarged portion of the counterbore, a collar on the extremity of said inner end, and an expansion spring in said enlarged portion between the collar and container for urging the plunger outwardly, said plunger having a frusto-conical portion intermediate its ends movable across the discharge outlet for controlling the discharge of the fluid escaping from the cartridge, and legs carried by said circular plug and extending inwardly of the container for holding the cartridge spaced away from the discharge outlet.

References Cited in the file of this patent

UNITED STATES PATENTS

| Number | Name | Date |
|---|---|---|
| 1,651,466 | Norris | Dec. 6, 1922 |
| 1,720,389 | Binks | July 9, 1929 |
| 1,742,605 | Lemoine | Jan. 7, 1930 |
| 1,875,821 | Nazare | Sept. 6, 1932 |
| 2,016,113 | Lambert et al. | Oct. 1, 1935 |
| 2,098,454 | Kelley | Nov. 9, 1937 |
| 2,169,142 | Stebbing | Aug. 8, 1939 |
| 2,347,010 | Ward | Apr. 18, 1944 |
| 2,362,784 | Ward | Nov. 14, 1944 |
| 2,398,434 | Mapes | Apr. 16, 1946 |